United States Patent
Howell

(10) Patent No.: US 10,385,885 B2
(45) Date of Patent: Aug. 20, 2019

(54) PNEUMATIC ACTUATOR WITH PISTON HAVING AN EXTENDED LIP

(71) Applicant: BorgWarner Inc., Auburn Hills, MI (US)

(72) Inventor: Ryan Howell, Hendersonville, NC (US)

(73) Assignee: BorgWarner Inc., Auburn Hills, MI (US)

(*) Notice: Subject to any disclaimer, the term of this patent is extended or adjusted under 35 U.S.C. 154(b) by 198 days.

(21) Appl. No.: 15/119,217

(22) PCT Filed: Feb. 16, 2015

(86) PCT No.: PCT/US2015/015992
§ 371 (c)(1),
(2) Date: Aug. 16, 2016

(87) PCT Pub. No.: WO2015/130495
PCT Pub. Date: Sep. 3, 2015

(65) Prior Publication Data
US 2017/0051765 A1    Feb. 23, 2017

Related U.S. Application Data

(60) Provisional application No. 61/944,612, filed on Feb. 26, 2014.

(51) Int. Cl.
*F15B 15/10* (2006.01)
*F02B 37/18* (2006.01)

(52) U.S. Cl.
CPC ............ *F15B 15/10* (2013.01); *F02B 37/186* (2013.01); *Y02T 10/144* (2013.01)

(58) Field of Classification Search
CPC .............. F16J 3/02; F01B 19/02; F15B 15/10

USPC ....................................................... 92/99, 100
See application file for complete search history.

(56) References Cited

U.S. PATENT DOCUMENTS

| | | | |
|---|---|---|---|
| 5,787,791 A | 8/1998 | Vertanen | |
| 6,155,048 A * | 12/2000 | Vertanen | F02B 37/183 251/61.4 |
| 6,349,629 B1 | 2/2002 | Plantan et al. | |

(Continued)

FOREIGN PATENT DOCUMENTS

JP    2001522976 A    11/2001

OTHER PUBLICATIONS

International Search Report and Written Opinion; dated May 29, 2015 for International Application No. PCT/US2015/015992; 9 pages.

*Primary Examiner* — F Daniel Lopez
*Assistant Examiner* — Daniel S Collins
(74) *Attorney, Agent, or Firm* — BrooksGroup

(57) ABSTRACT

A pneumatic actuator (312, 412) adapted for use with a turbocharger includes a diaphragm (16) having a valley (46), and a piston (314, 414) having a lip (350, 450) extending from a flange (344, 444). A portion of the lip (350, 450) curves or bends around the diaphragm (16) and possibly forms a double bend. The distal end (348, 448) of the piston (314, 414) is adapted to contact a majority of the valley (46) of the diaphragm (16) in its preloaded state. The distal end (348, 448) may have a complementary shape with a shape of the valley (46). The edge of the flange (344, 444) is always spaced away from the diaphragm (16) to prevent contact of the edge with the diaphragm (16).

5 Claims, 3 Drawing Sheets

(56) References Cited

U.S. PATENT DOCUMENTS 6,520,064 B1 2/2003 Gautier et al.
2005/0217266 A1 10/2005 Noelle

* cited by examiner

# PNEUMATIC ACTUATOR WITH PISTON HAVING AN EXTENDED LIP

CROSS-REFERENCE TO RELATED APPLICATION

This application claims priority to and all benefits of U.S. Provisional Application No. 61/944,612, filed on Feb. 26, 2014, and entitled "Pneumatic Actuator With Piston Having An Extended Lip," the contents of which are incorporated by reference herein.

BACKGROUND

Field of the Disclosure

This disclosure relates to a pneumatic actuator with a diaphragm used in conjunction with a piston having an extended lip. More particularly, this disclosure relates to a pneumatic actuator with a piston having a flange with an extended lip curved around the diaphragm so an edge of the piston flange will not contact the diaphragm during actuator movement.

Description of Related Art

Advantages of turbocharging include increased power output, lower fuel consumption and reduced pollutant emissions. The turbocharging of engines is no longer primarily seen from a high-power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a rotatable shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor impeller that is mounted on the same rotatable shaft so that rotation of the turbine wheel causes rotation of the compressor impeller.

Turbochargers typically include a turbine housing connected to the engine's exhaust manifold, a compressor housing connected to the engine's intake manifold, and a bearing housing coupling the turbine and compressor housings together. The bearing housing encloses and supports the rotatable shaft.

Turbocharger systems often use pneumatic actuators 12 with a piston 14 and a diaphragm 16. FIG. 1 as detailed below shows an actuator 12 adapted for use with a turbocharger.

The life expectancies for pneumatic actuators for turbochargers are increasing due to increasingly stringent emissions regulations and the new customer control strategies used to meet these regulations. The life of a pneumatic actuator 12 is typically reliant on the life of its diaphragm 16.

A common failure includes a radial tear in the valley 46 of the diaphragm 16 due to stress. The piston 14 often causes high stress in this area, which can be due a lack of support in this area as compared with other area of the diaphragm 16.

FIG. 1 shows a prior art pneumatic actuator 12 with a piston 14 and a diaphragm 16 adapted for use with a commercial diesel turbocharger. An actuator rod 18 moves a rod end 20, which connects to a turbocharger component to control its operation. A lower canister 22 and upper canister 24 may house a spring 26, the piston 14, and the diaphragm 16. Other components may include a heat shield 28 around the canisters 22 and 24, and actuator bracket 30 and stud plate 32 at an end with corresponding nuts 34 and studs 36. A bushing 38 and O-ring 40 for sealing are also shown. A hose barb 42 can extend from the upper canister 24 opposite the actuator rod 18.

The flange 44 of the piston 14 may be completely spaced away from the valley 46 of the diaphragm 16 as in FIG. 1. But often the design of the piston 14 is such that a flange 44 at an end of the piston 14 is in contact with the diaphragm 16 of the actuator 12 when the actuator 12 is in its natural or preloaded position as shown in FIG. 2. This design reduces stress in the valley 46 of the diaphragm 16, which is a typical area of failure.

When the piston 14 is in direct contact with the diaphragm 16, it must be free of burrs or sharp edges that can damage the diaphragm 16. Standard piston designs where the flange 44 is in contact with the diaphragm 16 can cause a circumferential tear in the valley 46 of the diaphragm 16 causing diaphragm failure.

Extending the skirt of the piston 14 away from the diaphragm 16 can help eliminate this failure mode. This one step increases the durability of the diaphragm 16 and thus the actuator 12. However, failures can still result from radial tears from stress, rather than circumferential tears. For example, an actuator having a piston that included simple skirt extension resulted in increased the stress in the valley 46 of the diaphragm 16 due to the removal of the diaphragm support provided by the flange 44 of the piston 14.

SUMMARY

This disclosure relates to a pneumatic actuator with a diaphragm used in conjunction with a piston having an extended lip so the edge (or rim) of the piston flange will not contact the diaphragm during actuator movement. The piston with its flange has substantial contact with the diaphragm, most notably the curves of the valley, in its preloaded state, while allowing minimal friction between the diaphragm and piston during relative movement and avoiding contact of the diaphragm with any edges of the flange of the piston.

This may enhance actuator life with minimal hysteresis impact. By allowing contact between the entire diaphragm valley and the piston, but eliminating contact with edges and rough surfaces, actuator life can be extended.

Reducing stress in the valley of the diaphragm may increase the life of a pneumatic actuator with a diaphragm used in conjunction with a piston with an extended flange adapted to function in conjunction with the valley. The piston can support the valley of the diaphragm to reduce that stress.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

Turbochargers are generally known and include a turbine and a compressor, wherein a compressor impeller is rotatably driven via a rotatable shaft by a turbine wheel. The turbocharger often uses a pneumatic actuator 12 with a piston 14 and a diaphragm 16. The piston 14 may be in contact with the diaphragm 16 of the actuator 12 when the actuator 12 is in its natural or preloaded position.

Figure 1:
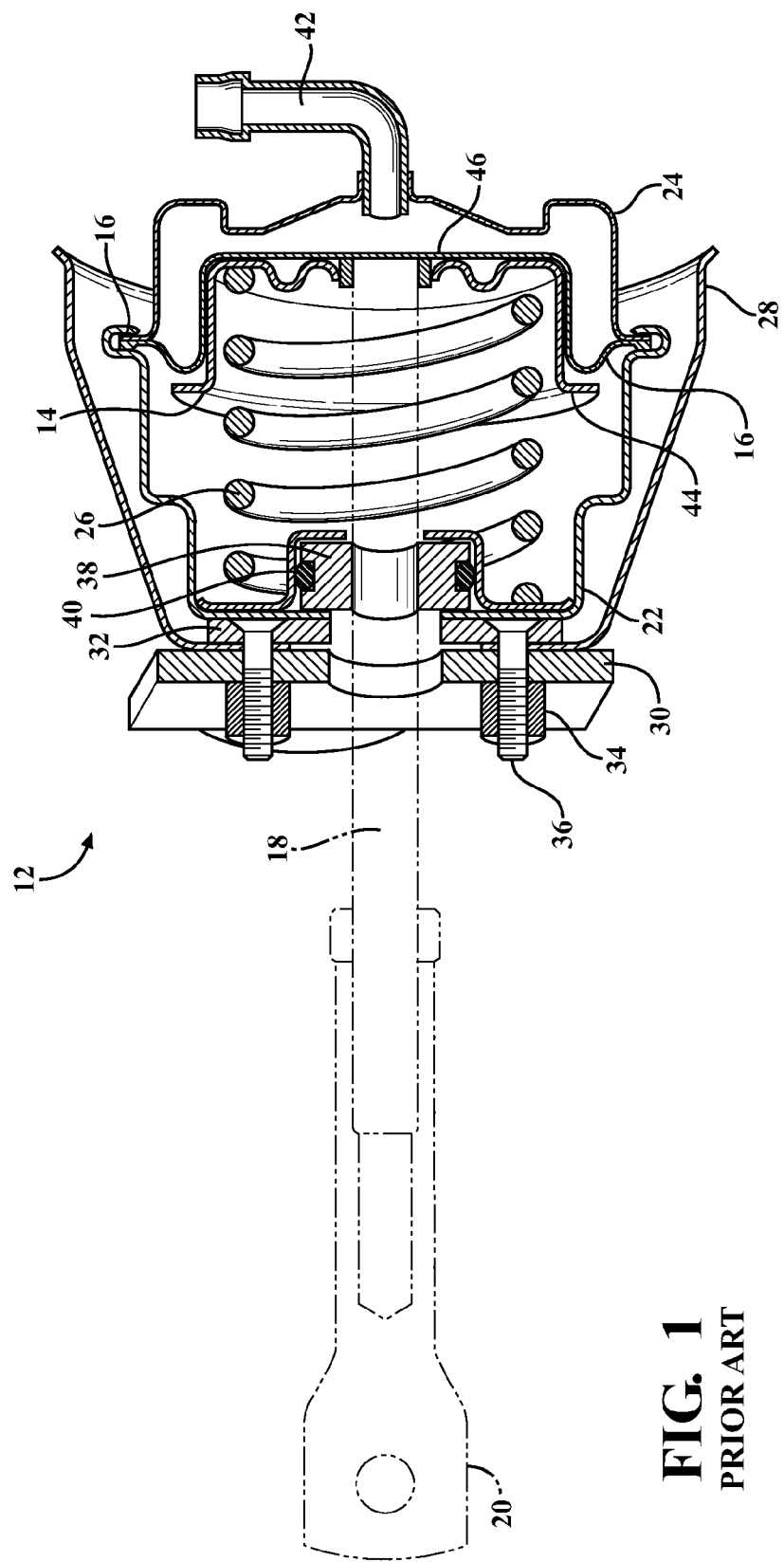
FIG. 1 is a cross-sectional view of a prior art pneumatic actuator adapted for use with a turbocharger.
Figure 2:
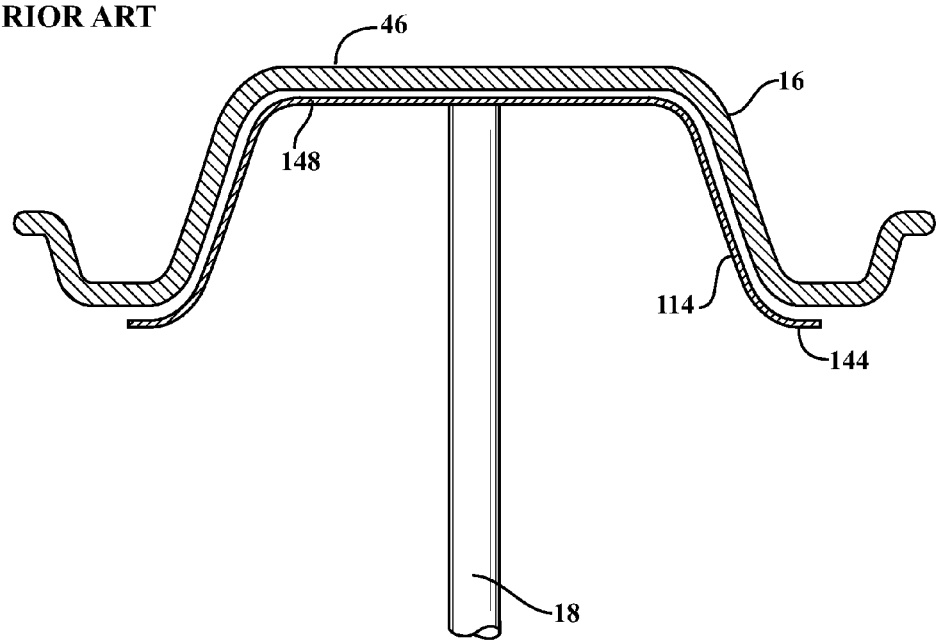
FIG. 2 is a schematic cross-sectional side view of a prior art standard piston design in a diaphragm.

FIG. 2 shows a prior art standard piston 114 in a diaphragm 16. The distal end 148 of the piston 114 fits into the complementary shape of the diaphragm valley 46. The distal end 148 of the piston 114 is adapted to contact the valley 46 of the diaphragm 16 in its preloaded state. The edge of the flange 144 can contact the diaphragm 16.

Figure 3:
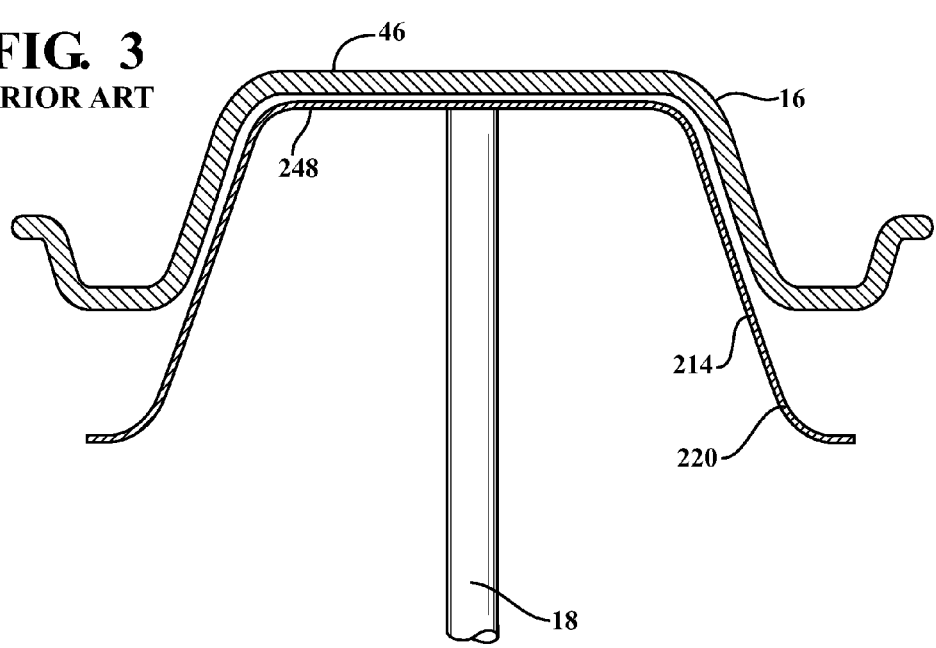
FIG. 3 is a schematic cross-sectional side view of a prior art piston design with a longer piston skirt.

FIG. 3 shows another prior art piston 214 with a longer extended piston skirt 220, but in use, radial tears of the diaphragm 16 can still occur due to stress. Contact with the piston 114, 214 in the valley 46 reduces stress, but previous example piston 114 would cause rub so the benefits of extended life were not seen. The extended skirt 220 shown in this example did not curve with the diaphragm 16. Removal of some support of the flange of the piston 14 can allow increased stress in the valley of the diaphragm 16.

Figure 4:
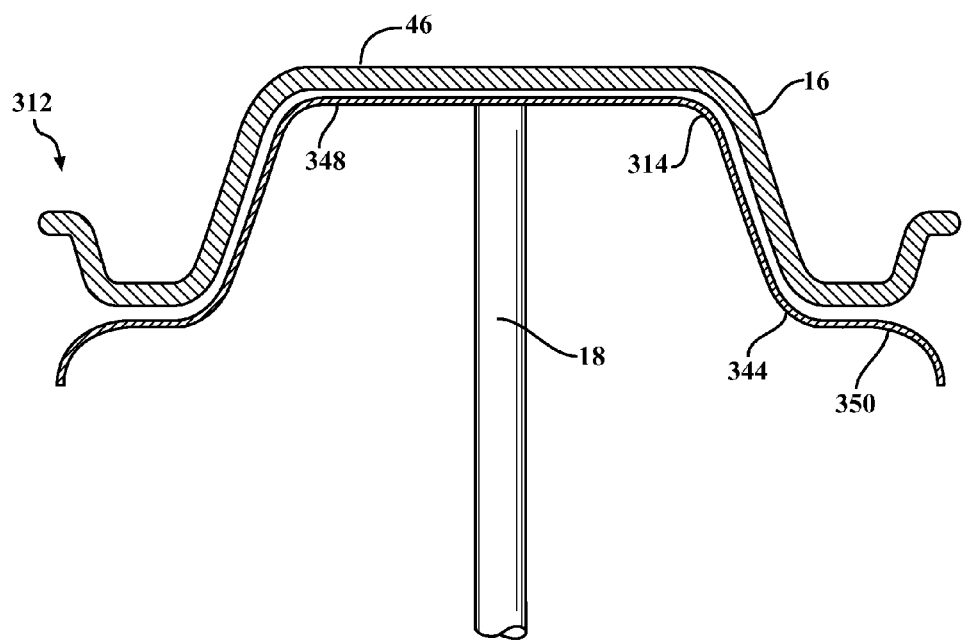
FIG. 4 is a schematic cross-sectional side view of a double bend piston with an extended lip with a second piston skirt.
Figure 5:
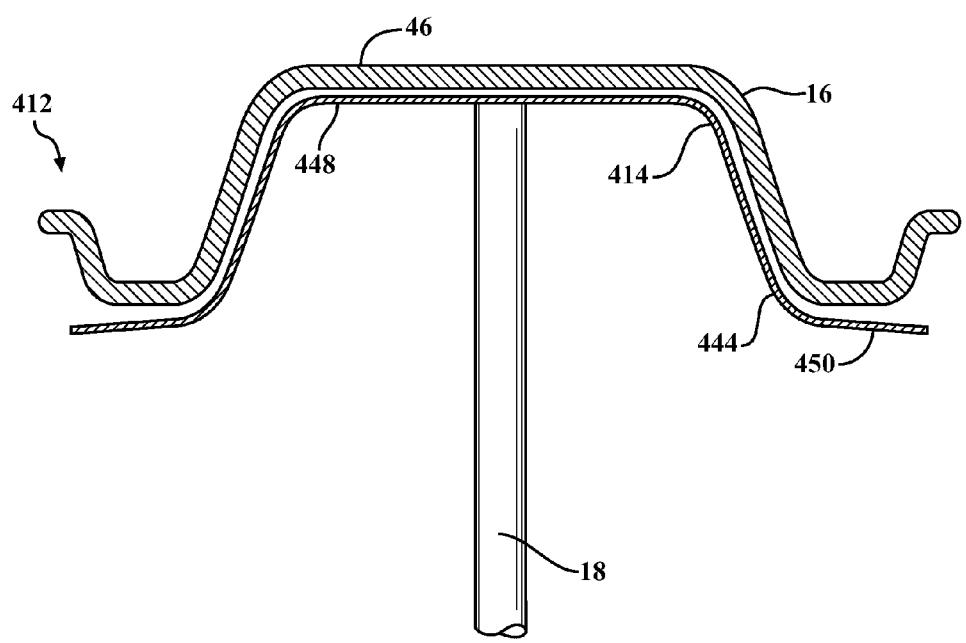
FIG. 5 is a schematic cross-sectional side view of a piston with an extended flange extending away radially from the valley of the diaphragm.

As shown in FIGS. 4 and 5, a pneumatic actuator 312, 412 has a diaphragm 16 used in conjunction with a piston 314, 414 having an extended lip 350, 450 so the edge (or rim) of the piston flange 344, 444 will not contact the diaphragm 16 during actuator movement. The piston 314, 414 preferably has maximum contact with the diaphragm 16, including the curves of the valley 46, in its preloaded state, while minimizing friction between the diaphragm 16 and the piston 314, 414 during relative movement and avoiding contact of the diaphragm 16 with any edge of the flange 344, 444 of the piston 314, 414.

FIG. 4 shows a piston 314 with a double bend, which effectively adds a second piston skirt where a portion of the lip 350 curves and bends around the diaphragm 16 for contact where the diaphragm 16 curves. This extended double bend eliminates any contact between the edge of the piston flange 344 with the diaphragm 16 while allowing for substantial contact of the piston distal end 348 with the valley 46 of the diaphragm 16.

FIG. 5 shows an alternate piston 414 with a lip 450 of the flange 44 extending away radially from the valley 46 of the diaphragm 16. A portion of the lip 450 curves around the diaphragm 16 for maximum contact with the diaphragm 16, and the edge of the flange 444 is always spaced away from the diaphragm 16. The distal end 448 of the piston 414 can support the valley 46 of the diaphragm 16 to reduce the stress in the valley 46.

Reducing stress in the valley 46 of the diaphragm 16 may increase the life of a pneumatic actuator 312, 412 with a diaphragm 16 used in conjunction with a piston 314, 414 with an extended flange 344, 444 as a lip 350, 450. The extended, curved lip 450 of FIG. 5 is a simpler design than the double bend of the extended lip 350 with a second skirt of FIG. 4. Both embodiments have the piston 314, 414 designed for contact with the valley 46 of the diaphragm 16 in its preloaded state while ensuring that the edge of the flange 344, 444 will not contact the diaphragm 16 during actuator movement and preferably always spaced away from the diaphragm 16. Other shapes of the extended lip and flange are possible while meeting these criteria.

This pneumatic actuator 312, 412 with a piston 314, 414 having an extended lip 350, 450 with as much diaphragm 16 contact as possible in its preloaded state may enhance actuator life with minimal hysteresis impact. By allowing contact between the entire diaphragm valley 46 and the piston 314, 414, but eliminating any contact with sharp edges and burrs, actuator life can be extended. The piston 314, 414 must be designed to prevent unnecessary additional friction between the diaphragm 16 and piston 314, 414 as this would also be detrimental to actuator performance and hysteresis.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically described.

What is claimed is:

1. A pneumatic actuator adapted for use with a turbocharger, the pneumatic actuator comprising:
   a diaphragm having a valley;
   a piston including a head, wherein a flange extends downward from a distal end of the head, wherein the head and the flange have a complementary shape of the valley, and a lip extending radially outward from an end of the flange; and
   wherein the piston is constructed and arranged so that in a preloaded state, the head and the flange contact the valley of the diaphragm and a portion of the lip contacts the diaphragm and a rim of the lip does not contact the diaphragm.

2. A pneumatic actuator adapted for use with a turbocharger, the pneumatic actuator comprising:
   a diaphragm having a valley;
   a piston including a head, wherein a flange extends downward from a distal end of the head, wherein the head and the flange have a complementary shape of the valley, and a lip extending radially outward from an end of the flange, wherein a rim of the lip is curved downward away from the diaphragm; and
   wherein the piston is constructed and arranged so that in a preloaded state, the head and the flange contact the valley of the diaphragm and the rim of the lip does not contact the diaphragm.

3. A pneumatic actuator adapted for use with a turbocharger, the pneumatic actuator comprising:
   a diaphragm having a valley; and
   a piston comprising a head, a flange extending downward from a distal end of the head defining a skirt, a lip extending radially outward from the flange, wherein a portion of the lip bends around the diaphragm and a portion of the lip bends away from the diaphragm;

wherein the head and the skirt have a complementary shape of the valley of the diaphragm; and wherein the piston is constructed and arranged so that in a preloaded state, the head and the skirt are in contact with the valley of the diaphragm.

4. A pneumatic actuator comprising:

a diaphragm having a valley;

a piston comprising a head, a flange extending downward from a distal end of the head, and a lip extending radially from an end of the flange;

wherein the head and the flange have a complementary shape of the valley, and wherein a portion of the lip is curved around a portion of the diaphragm; and wherein the piston is constructed and arranged so that in a preloaded state, the head, the flange, and a portion of the lip are in contact with the diaphragm and an end of the lip is not in contact with the diaphragm.

5. A pneumatic actuator comprising:

a diaphragm having a valley;

a piston comprising a head, a flange extending downward from a distal end of the head, and a lip extending radially from an end of the flange;

wherein the head and the flange have a complementary shape of the valley, wherein a portion of the lip is curved around a portion of the diaphragm, and wherein an end of the lip is curved away from the diaphragm; and wherein the piston is constructed and arranged so that in a preloaded state, the head and the flange are in contact with the diaphragm and the end of the lip is not in contact with the diaphragm.

* * * * *